United States Patent [19]
Jaulmes

[11] 3,773,131
[45] Nov. 20, 1973

[54] ELECTRIC AUTOCYCLE
[75] Inventor: Eric Jaulmes, Paris, France
[73] Assignee: Ateliers De La Motobecane, Pantin (Seine Saint Denis), France
[22] Filed: Mar. 23, 1971
[21] Appl. No.: 127,194

[30] Foreign Application Priority Data
Mar. 31, 1970 France .............................. 7011382

[52] U.S. Cl. ............... 180/34, 180/33 A, 180/33 B, 180/33 C, 180/35
[51] Int. Cl.... B62d 61/02, B60k 17/26, B62m 7/12
[58] Field of Search ................. 180/34, 33 R, 33 A, 180/33 B, 33 C

[56] References Cited
UNITED STATES PATENTS

| | | | |
|---|---|---|---|
| 2,179,418 | 11/1936 | McDonald | 180/34 X |
| 3,533,484 | 10/1970 | Wood, Jr. | 180/34 X |
| 656,323 | 8/1900 | Hansel | 180/34 |
| 2,454,991 | 11/1948 | Cooke | 180/33 B |
| 740,676 | 10/1903 | Merkel | 180/35 |
| R26,608 | 6/1969 | Hopkins | 180/33 R |
| 3,437,162 | 4/1969 | Diehl et al. | 180/33 R |
| 1,097,546 | 5/1914 | Harley | 180/33 B |
| 675,391 | 6/1901 | Keating | 180/33 A |

FOREIGN PATENTS OR APPLICATIONS

| | | | |
|---|---|---|---|
| 443,948 | 2/1968 | Switzerland | 180/34 |
| 1,030,048 | 6/1953 | France | 180/33 B |

Primary Examiner—Kenneth H. Betts
Assistant Examiner—John P. Silverstrim
Attorney—Greene & Durr

[57] ABSTRACT

A pedal-operable vehicle is provided with electric means to operate the same which comprises a storage battery, a relatively thin motor, a speed reducing transmission which includes a free wheel between the motor and one of the wheels of the vehicle and an electronic control means for the motor which provides for electrical operation of the motor only after the vehicle has reached a predetermined maximum speed.

6 Claims, 7 Drawing Figures

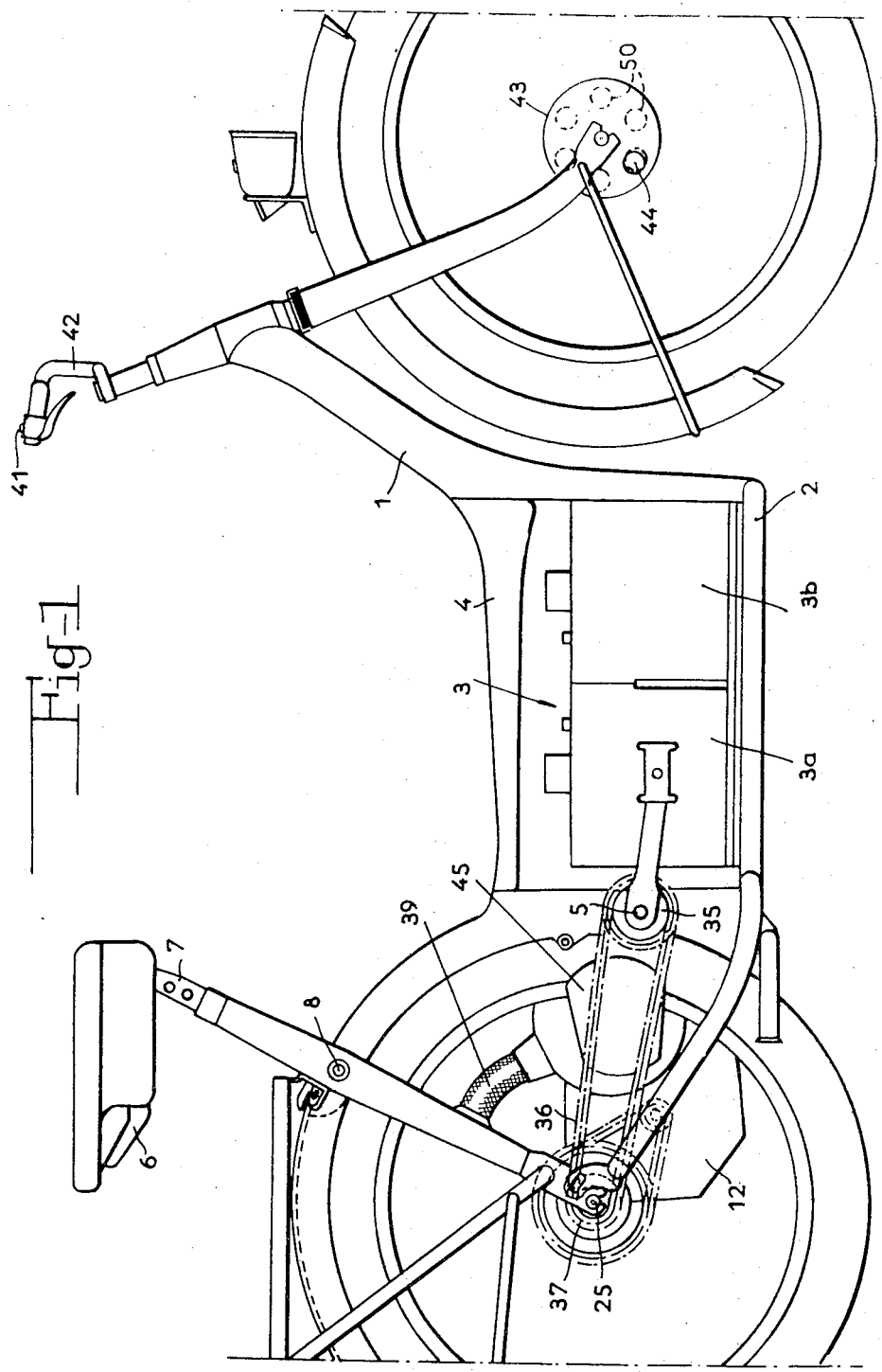

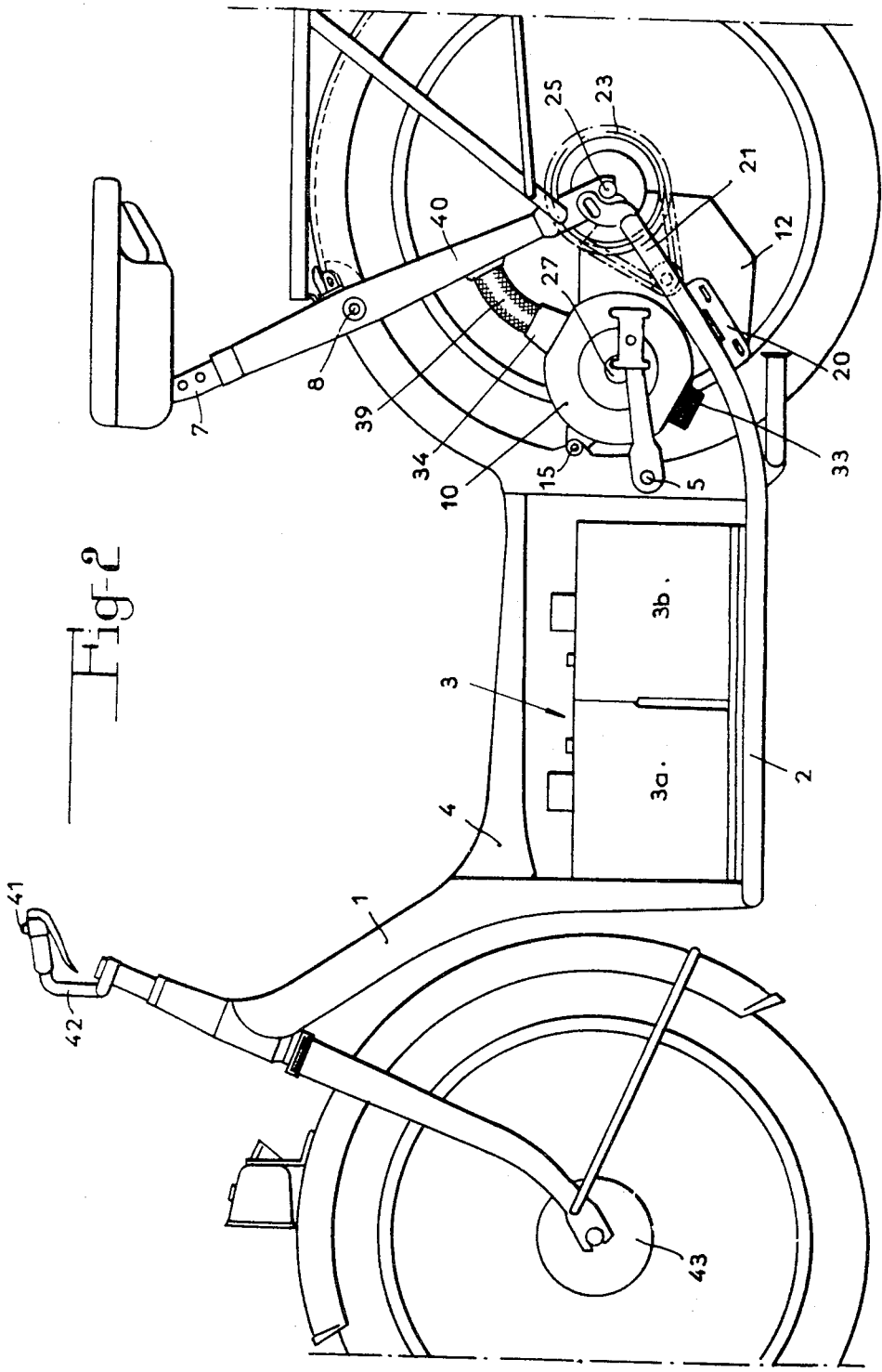

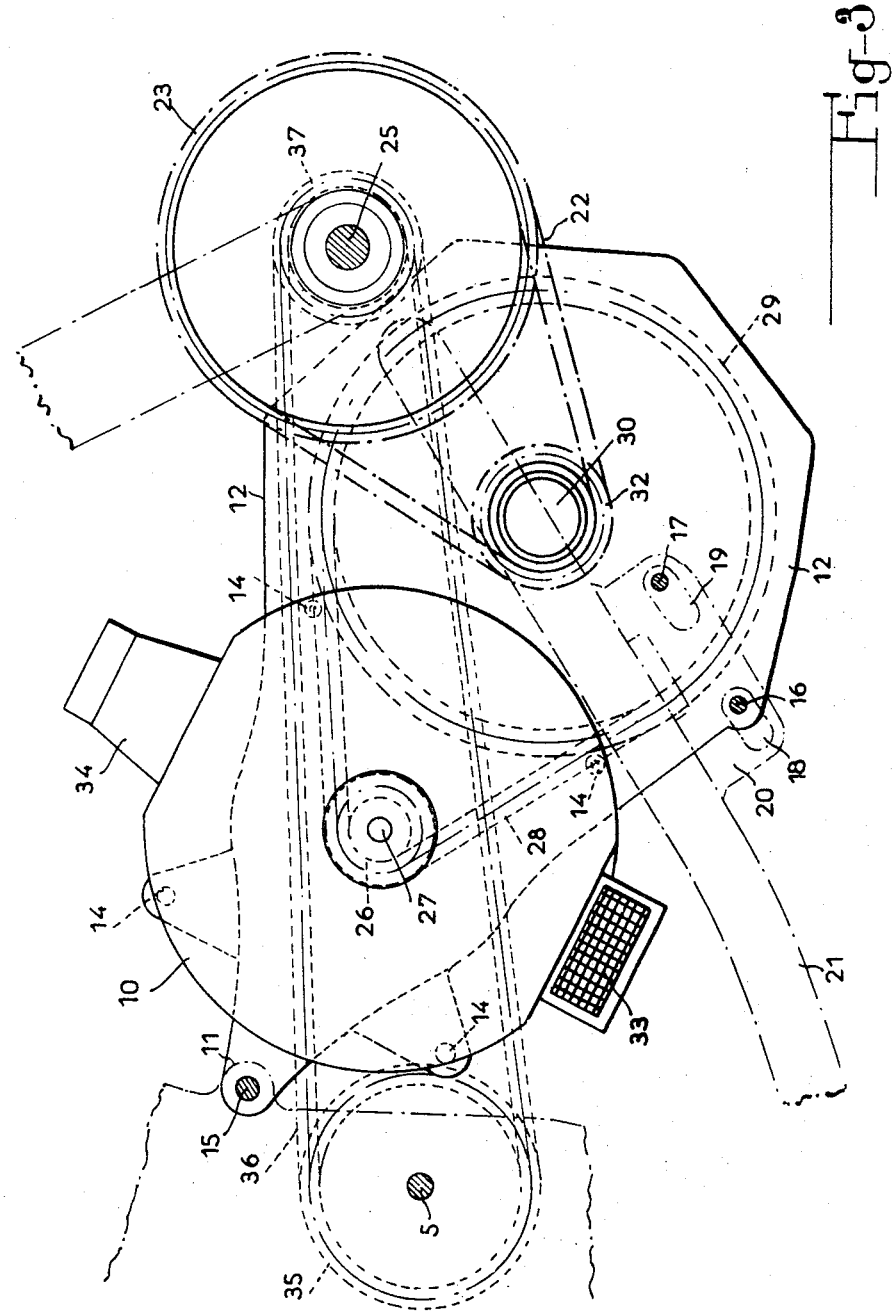

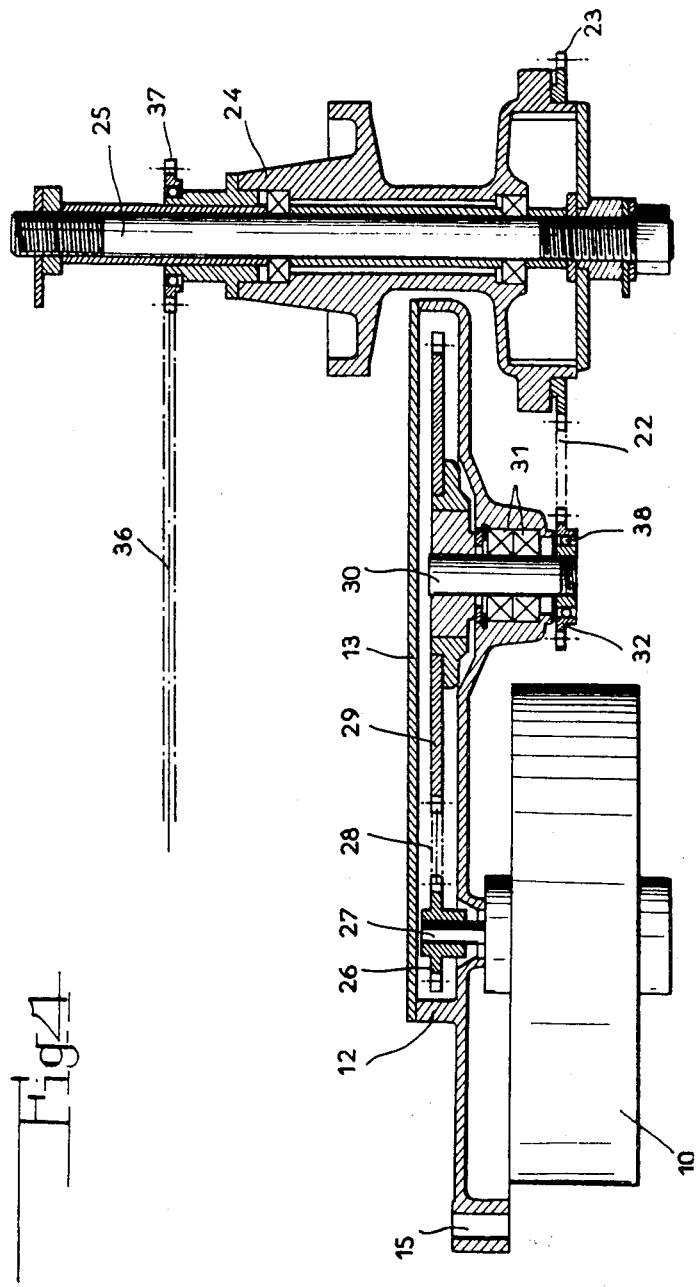

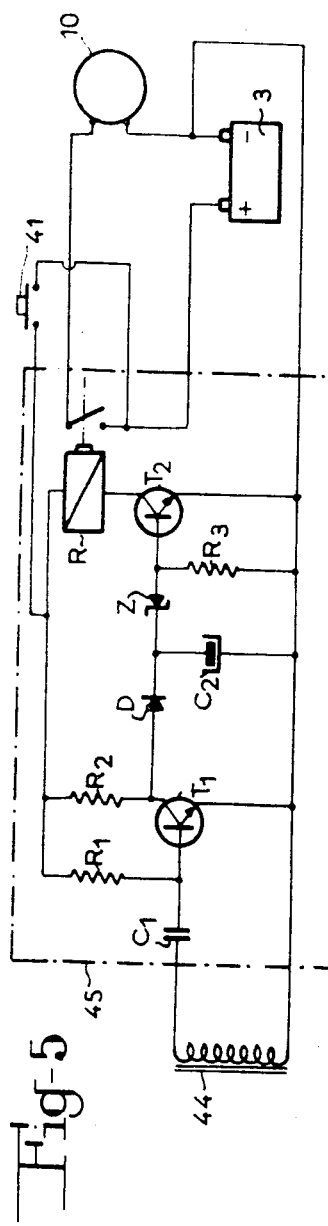
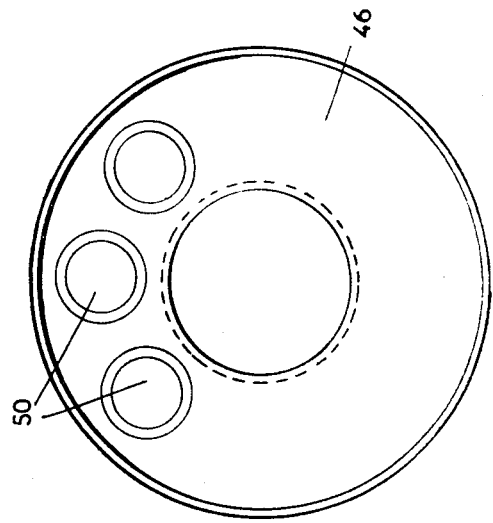
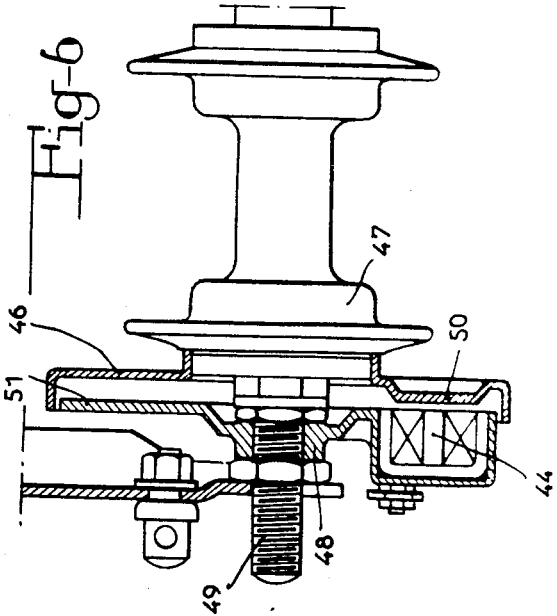

ELECTRIC AUTOCYCLE

The principal problem to resolve in constructing a two-wheeled electrically powered vehicle fed by an accumulator or storage battery, lies in obtaining an adequate range of operation distance. It is considered that the range must be of 30 to 40 kilometers for a vehicle having an average speed lying between 20 and 25 k.p.h. It can be achieved, when using the currently available lead batteries, of a weight limited for example to 25 kilograms for a pair of batteries, only by rigorously eliminating all stray losses of power.

One solution to this problem is provided by the present invention. In order to reduce, as far as possible, the consumption of current, the two-wheeled electric vehicle of the invention is equipped with a motor of which the mass and thermal inertias are the weakest possible, as the state of the art stands. This involves the currently available discoidal motor with lamelliform coils.

Such a motor, which is very flat, lends itself remarkably well to this application by permitting its location in the vehicle at a position which would have been out of the question had it been necessary to use a motor with an ordinary type of coils, namely in engagement with the peri phery of the rear wheel.

Still with a view to eliminating all stray consumption of current and still following the invention, no regulating devices such as a rheostat is used, the motor therefore works at full speed or not at all, keeping in mind the low speed of the vehicle, and the low powers at work. The initial cost of the machine, on the other hand, is equally reduced.

Furthermore, and following another feature of the invention, the one necessary manual switch is associated in series with an automatic switching device responsive to the road speed of the vehicle, and only permitting the switching on of the motor after the machine has acquired a sufficient, minimal speed. Below this, the vehicle is pedal driven, and a free wheel prevents the read wheel from driving the motor.

The two-wheeled electric vehicle conforming to the present invention is essentially characterised by the functional combination of five means which are know separately but not in association, which are:

a. an accumulator or storage battery
b. a discoidal motor with lamelliform coils
c. electronic controlling apparatus acting as a function of the speed of the vehicle
d. a speed-reducing transmission comprising a free wheel, and
e. a pedal system.

Further features of the invention are directed to the general layout and the fittings of the two-wheeled electric vehicle, appropriate to the construction of the machine which while having the range of operation indicated above, will lie in the accepted scale of autocycles, and also in which the position of the user, that is to say the relative location of the saddle and the pedal system, and the spacing of the pedals, will remain satisfactory, despite the necessarily bulky storage batteries.

The presence of pedals further offers the advantage of making the machine similar to motor cycles as defined in numerous enactments, which permits benefit to be taken of certain administrative advantages.

These original characteristics of the machine conforming to the present invention will be readily apparent from the description given below in relation to a construction shown very schematically, simply as an example, in the accompanying drawings as follows:

FIG. 1 shows an elevation from the right of the two-wheeled electric vehicle according to the invention;

FIG. 2 is an elevation from the left;

FIG. 3 shows on a larger scale the discoidal motor and the speed-reducing transmission provided between the motor and the rear wheel, as well as the direct transmission between the pedal and the rear wheel;

FIG. 4 shows in longitudinal horizontal section the subject of FIG. 3;

FIG. 5 is an electronic circuit for controlling the motor, in accordance with this invention;

FIG. 6 shows in longitudinal section an example of a pick up; and

FIG. 7 is an end view of the rotary piece associated with the pick up.

The frame 1, having a low form, comprises a lower platform 2 situated on a lower level than that of the axis of the pedals, and carrying the battery of accumulators 3, constituted here by two storage batteries 3a and 3b. The necessary rigidity of this part of the frame, having regard to the high weight of the battery, is provided by an overlying medial beam 4. It is seen that the battery 3 lies ahead of the pedals, the axis of which is designated by 5. To achieve a normal position for the user, despite the rearward displacement of the pedals, the mounting of the saddle 6 is more or less turned round, and is mounted on the saddle tube 7 in the neighborhood of the nose of the saddle.

Referring more particularly to FIGS. 3 and 4, it with the lamillilform coils referred to above is seen that the discoidal motor 10 is carried by a housing 12 which contains the primary part of the transmission and which is covered by a lid 13. The mounting of the motor on the housing is carried out, in the example shown, by four bolts 14 passing through the framework or stator of the motor. The rigid assembly constituted by the motor and the housing is mounted on the frame 1 by means of an axle 15 passing through lugs 11 carried by the frame, and around which it can pivot, as well as by two gudgeon pins 16 and 17 carried by the housing 12, and passing into two small slots 18 and 19 in an ear 20 which is welded to the lower left limb 21 of the rear fork. This mounting permits the easy adjustment of the tension in the secondary chain 22 of the driving transmission, driving the sprocket 23 carried by the hub 24 (FIG. 4) of the rear wheel, and the axis of which is designated by 25.

As for the chain 36 of the pedal system, it can be adjusted by any appropriate means. In the example shown, it is tensioned by a movement of the assembly of the rear wheel and its stays 40, about the horizontal axle 8 carried by the frame.

The speed-reducing transmission contained in the housing 12 comprises the pinion 26 keyed on the output shaft 27 of the motor 10, a primary chain 28 coupling the pinion 26 to the sprocket 29 keyed on an intermediate shaft 30 which is supported in the housing 12 by a double bearing 31, and a secondary toothed pinion 32 similarly keyed on the shaft 30 outside the housing 10, and which drives the toothed gear wheel 23 of the rear wheel through the secondary chain 22.

The "cycling" transmission between the pedal system and the rear wheel is achieved, in a known manner, by a pedal plate 35 keyed on the pedal shaft 5, at its right extremity, and by a chain 36 which drives a toothed pinion 37 with a free wheel, mounted on the hub 24 of the rear wheel, opposite to the fixed toothed gear 23.

It is seen that the housing 12 defines, with its cover 13, an enclosure which is easily rendered leak-proof so that the primary transmission, having the greater speed, works in an oil bath, thus reducing wear and ensuring quiet working.

As already stated, a free wheel is interposed between the motor and the rear wheel, in a manner such that it drives the rear wheel but cannot be driven thereby. This free wheel, designated by 38, is preferably in operative association with the secondary pinion 32, because its addition to the primary pinion 26 would present constructional difficulties, on account of its very small diameter.

The weak thermal inertia of the discoidal motor 10, the rotor of which is very thin, very fortunately permits one to dispense, in accordance with this invention, with all special apparatus for forced cooling, such as fans, fins or blowers, which are bulky and absorb a significant amount of power. The motor stator comprises simply a lower air intake opening 33 to which there corresponds an upper diametrically opposed air exhaust tube 34. Preferably, and in accordance with the invention, a flexible sleeve 39 communicates between the tube 34 and the hollow branch 40 of the rear fork which constitutes with the saddle tube 7, the upper part of which is perforated, a draught chimney in which a natural current is rapidly established, sufficient to cool the motor, having regard to its particular nature.

Still in accordance with the invention, an automatic switching device constituted by an electronic circuit controlling a relay, is provides which depends on the road speed of the machine. It is associated with a manual control switch acting directly on the electronic circuit.

The manual switch 41 is preferably incorporated at one of the rotatable handles on the handlebar 42. In a known manner, the handle is biased by a spring to its "switch open" position, in such a way that the motor can only be supplied when the operator is using the machine.

Switching on of the motor is only possible if the vehicle has attained a predetermined minimal speed. Under this condition, the motor having weak inertia and driving only the first stage of the transmission, quickly attains the mode of operation appropriate to that speed of the machine achieved by a pedalling, the mode being that at which the back emf developed by the motor limits the discharge of current to a permissible value.

The switching apparatus is positioned in the hub of the front wheel. It is constituted by an electromagnetic pick-up emitting electric pulses at each revolution of the wheel.

This principle of detecting frequency by the control circuit is judged to be preferable to an alternative arrangement which consists in detecting the voltage of a generator, in determining for it a value above which a relay would be closed. In effect, in the last case, possible variations in air gaps would give rise to variations in the number of turns corresponding to the chosen value.

The pulses are passed to an electronic circuit contained in a box 45 seen clearly in FIG. 1, and represented schematically in FIG. 5.

The low power electromagnetic pick-up 44 supplies an alternating signal. The negative half cycles applied to the condenser C1 block and transistor T1, which is saturated through the resistance R1, thus making properly formed and calibrated signals appear at the terminals of the load resistance R2. The signals are integrated through the diode D by the condenser C2. When the frequency of the signals builds up, the voltage across the terminals of C2 attains the Zener value of the diode Z, a positive voltage appears across the terminals of the resistance R3 and the transistor T2 becomes saturated, thereby assuring the closing of contacts of the relay R and in consequence the supply to the driving motor 10 by the battery 3, if the manual switch 41 is closed. This arrangement is not sensitive to air gap variations in the electromagnetic pick-up 44, which can be as much as one millimeter for example. A lateral or axial air gap can therefore be used, permitting a simple and economic construction.

The pick-up 44 is constructed having the form of a cylindrical tube with a central magnet (see FIG. 6). A piece 46 of pressed sheet metal having a circular form, secured to the hub 47 of the front wheel, turns past the pick-up 44. The pick-up 44 is located in a housing 48 of Zamac, for example, clamped on the axle 49 of the wheel. It is seen that the rotatable plate 46 comprises several stamped depressions 50, the bases of which are spaced from the plane of the plate. Thus, during movement of the depressions past the pick-up 44, the air gap variation gives rise to signals which are transmitted to the electronic control apparatus 45.

Obviously, the pick-up 44 can have any other convenient form.

It is advantageous that the electronic circuitry is located completely in the box 45, in a sealed manner, and easily disconnectable and separable from the frame of the vehicle.

On the other hand, and still in accordance with the invention, provision is made for electrical isolation of the permanent magnets of the motor from the stator thereof, or from the body which carries them with respect to earth.

Thus, in the event of a deformation of the discoidal rotor, always a possibility by reason particularly of its shape, accidental contact between the rotor and the magnets will not occasion a passage of current between the rotor and the magnets causing destructive sparking of the lamella coils.

A known type of discharge indicator can be incorporated, for example, at the battery 3.

A two-wheeled electric vehicle constructed in accordance with this invention is used in the following manner.

The user starts the vehicle by pedalling, and the free wheel 38 incorporated at the secondary pinion 32 prevents the motor 10 from being driven by the rear wheel. The manual switch 41 is at the same time closed, by rotation of the handle incorporating it.

When the speed of the vehicle has become sufficient, that is to say when it corresponds to a speed of rotation of the motor 10 high enough to generate the necessary back emf, the frequency of the signals emitted by the pick-up 44 is itself high enough for the electronic circuit 45 to close the contacts of the relay R, thus permitting current to be supplied to the unloaded motor 10 which then rapidly starts and then ensures the propulsion of the vehicle.

If the speed falls below the given limiting value, for example if the cyclist brakes, the frequency of the signals emitted by the pick-up 44 diminishes and the relay R cuts out the supply to the motor.

There is obviously nothing to stop the rider from helping the motor at low speeds by pedalling. He can also ensure the propulsion by mere pedalling, for example, in the case of a low battery, without having to drive the motor, At any moment, the driver can interrupt the current supply to the motor by operating the manual switch 41 to benefit from the starting of the motor, or during a descent of a hill for example, thus appropriately reducing the consumption of current, the free wheel 38 then preventing the motor from being driven.

It is to be observed that the consumption of current of the electronic components of the circuit 45 is infinitesimal. The same is true for the interruptor relay R. The consumption of current will lastly be diminished if the driver cuts the supply to the motor each time that the occasion presents itself, in the interests of the most economical driving.

In this spirit, the means which consist, according to the invention, of disposing the pick-up 44 in the hub 43 of the front wheel, further eliminates a risk of useless consumption. In effect, the driver will not be tempted, when the machine is stationary and supported in a cycle frame, to start the motor by pedalling, as he would be if the pick-up were incorporated in the rear wheel which is not resting on the ground.

Thanks to the summation of all these means, the actuating current provided by the battery is the maximum possible.

Of course, numerous constructional modifications can be made to the different elements of the electrically driven vehicle described and shown herein, as well as to their arrangement, without departing from the scope of this invention. Although the device is described as essentially for a two wheeled vehicle, it is also applicable for three wheeled pedal vehicles.

I claim:

1. An electric vehicle having two wheels comprising a frame for rotatably mounting the wheels one in front of the other, a pedal system for manually operating the vehicle, motor means for driving one wheel of the vehicle, said motor means including a discoidal motor with lamelliform coils and a two-stage speed-reducing transmission device retained in a housing situated on a plane parallel to that of the rear wheel, a free wheel at the output of said transmission device and chain means connecting the free wheel to the rear wheel of the vehicle whereby to permit driving the rear wheel by the motor but to prevent the rear wheel from driving the motor or transmission device, a manually operated on-off switch which either switches the motor to full speed or not at all, an automatic, electronically controlled switch for the motor in series with the manual switch, the electronic control of said automatic switch being responsive to the road speed of the vehicle whereby the switching on of the motor is permitted only when the vehicle has acquired a predetermined minimal speed and after the manual switch has been closed, and an electromagnetic pick-up disposed adjacent the hub of the front wheel for operating said automatic switch.

2. An electric vehicle according to claim 1, characterized by the fact that the automatic switching apparatus comprises an electronic circuit of a construction appropriate to be controlled by the pick-up, said electronic circuit being controlled by signals of a certain predetermined minimal frequency.

3. An electric vehicle according to claim 2, characterized by the fact that the electromagnetic pick-up comprises the combination of a magnet, mounted at the periphery of a stationary housing, and of a circular formed rotor plate mounted to rotate with said front wheel and having several depressions, the bases of which, being offset with respect to the plane of the said plate, cause by their movement past the pick-up, air gap variations, which give rise to control signals.

4. An electric vehicle having two wheels comprising a frame for rotatably mounting the wheels one in front of the other, a pedal system for manually operating the vehicle, motor means for driving one wheel of the vehicle, said motor means including a discoidal motor with lamelliform coils and a two-stage speed-reducing transmission device retained in a housing situated on a plane parallel to that of the rear wheel, a free wheel at the output of said transmission device and chain means connecting the free wheel to the rear wheel of the vehicle whereby to permit driving the rear wheel by the motor but to prevent the rear wheel from driving the motor or transmission device, a manually operated on-off switch which either switches the motor to full speed or not at all, an automatic, electronically controlled switch for the motor in series with the manual switch, the electronic control of said automatic switch being responsive to the road speed of the vehicle whereby the switching on of the motor is permitted only when the vehicle has acquired a predetermined minimal speed and after the manual switch has been closed, said motor means and said housing being mounted on a rigid assembly, said assembly being mounted on the frame by means of a transverse horizontal axle about which it can pivot, said frame having a rear fork spanning the rear wheel, gudgeon pins carried by the housing and passing into small slots in an ear welded to the lower branch of the rear fork whereby the tension between the chain connecting the free wheel to the rear wheel may be adjusted by changing the position of said assembly.

5. An electric vehicle having two wheels, a frame for rotatably holding said wheels one in front of the other, pedal means to manually drive the rear wheel, motor means for driving said rear wheel including a two-stage, speed-reducing, transmission device between the motor and the rear wheel, the transmission device including a free wheel adapted to drive said rear wheel through a chain, but mounted so as not to be driven by said rear wheel, electric storage batteries to drive said motor, a manual switch and, in series with the latter, an automatic, electronic switch means constructed to close only after a predetermined minimal speed has been reached for connecting power from the batteries to the motor whereby the motor either operates at full speed or not at all, said frame including a platform situated in front of said pedal means and below the horizontal plane passing through the axis of the pedal means, said batteries being mounted on said platform, said entire two-stage transmission device, except for the free wheel, being housed in an oil-filled, fluid-tight, gear case, said motor being of discordal type and being attached laterally of the primary stage of the two-stage transmission device, said gear case being pivotally mounted on said frame so that the tension on the chain connecting the free-wheel to the rear wheel can be adjusted.

6. An electric vehicle having two wheels, a frame for rotatably holding said wheels one in front of the other, pedal means to manually drive the rear wheel, motor means for driving said rear wheel including a two stage, speed reducing, transmission device between the motor and the rear wheel, the transmission device including a free wheel adapted to drive said rear wheel through a chain, but mounted so as not to be driven by said rear wheel, electric storage batteries to drive said motor, a manual switch and, in series with the latter, an automatic, electronic switch means constructed to close only after a predetermined minimal speed has been reached for connecting power from the batteries to the motor whereby the motor either operates at full speed or not at all, said frame including a platform situated in front of said pedal means and below the horizontal plane passing through the axis of the pedal means, said batteries being mounted on said platform, said automatic electronic switch means comprising an electronic circuit which includes frequency dependent means to close the switch when signals above a predetermined minimal frequency are impressed thereon, said circuit also including electromagnetic pick-up means associated with one of the vehicle wheels adapted to generate electric signals on rotation of said wheel which signals have a frequency dependent on the speed of rotation of said wheel whereby the said electronic switch automatically closes when a predetermined speed of the vehicle has been attained.

* * * * *